United States Patent

Riddiford et al.

[11] Patent Number: 5,967,199
[45] Date of Patent: Oct. 19, 1999

[54] PRESSURIZED BRAKE BLEED SYSTEM

[75] Inventors: Bryan Peter Riddiford, Dayton; John Benjamin Hageman; Donald Edward Schenk, both of Vandalia, all of Ohio

[73] Assignee: General Motors Corporation, Detroit, Mich.

[21] Appl. No.: 09/078,156

[22] Filed: May 13, 1998

[51] Int. Cl.⁶ .................................................. B65B 1/08
[52] U.S. Cl. ........................... 141/67; 141/114; 188/352
[58] Field of Search .......................... 222/95, 105, 386.5, 222/387, 389, 103; 141/67, 65, 98, 114; 184/1.5; 188/352; 128/205.16, 205.17

[56] References Cited

U.S. PATENT DOCUMENTS

| | | | |
|---|---|---|---|
| 2,872,951 | 2/1959 | Wilkerson | 141/94 |
| 3,548,978 | 12/1970 | Dyke | 188/152 |
| 3,756,367 | 9/1973 | Mitchell et al. | 188/352 |
| 4,493,349 | 1/1985 | Pomponio, Sr. | 141/59 |
| 4,624,290 | 11/1986 | Compton et al. | 141/1 |
| 4,693,286 | 9/1987 | Lock et al. | 141/61 |
| 5,088,529 | 2/1992 | Jones et al. | 141/59 |

*Primary Examiner*—David J. Walczak
*Assistant Examiner*—Peter deVore
*Attorney, Agent, or Firm*—Jeffrey A. Sedlar; Robert M. Sigler

[57] ABSTRACT

A pressurized brake bleed system includes a rigid container, a flexible container containing brake fluid disposed within the rigid container, a hose having one end connected to the flexible container and another end for connection to a fluid reservoir of a brake system and a structure to apply a force to pressurize the flexible container to bleed the brake fluid from the flexible container through the hose to the fluid reservoir.

8 Claims, 1 Drawing Sheet

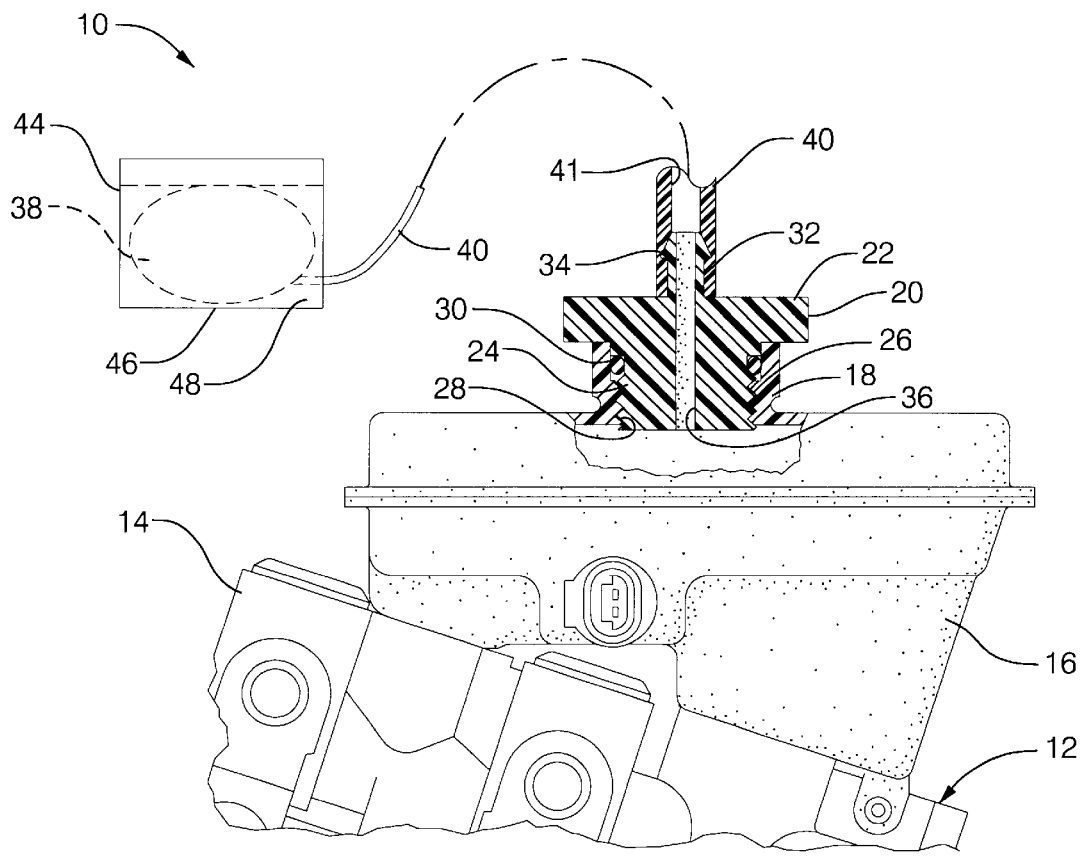
FIG. 1
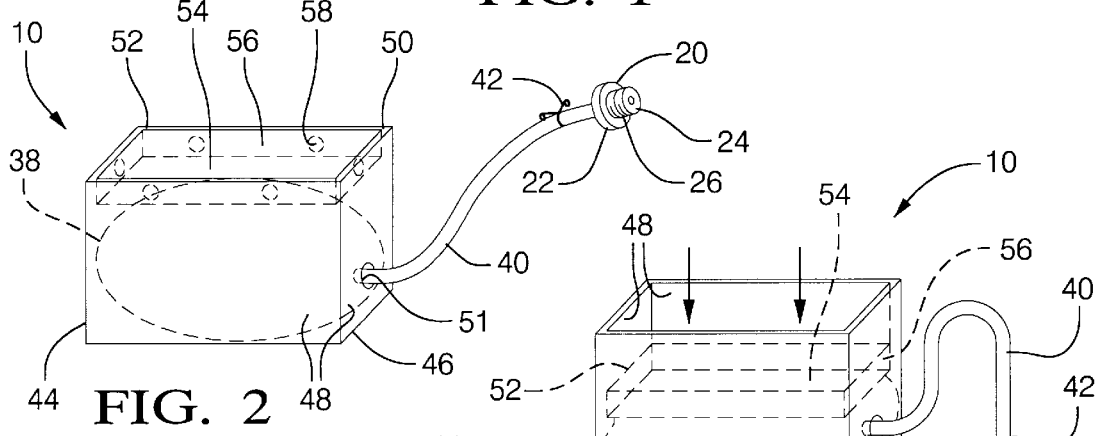
FIG. 2
FIG. 3
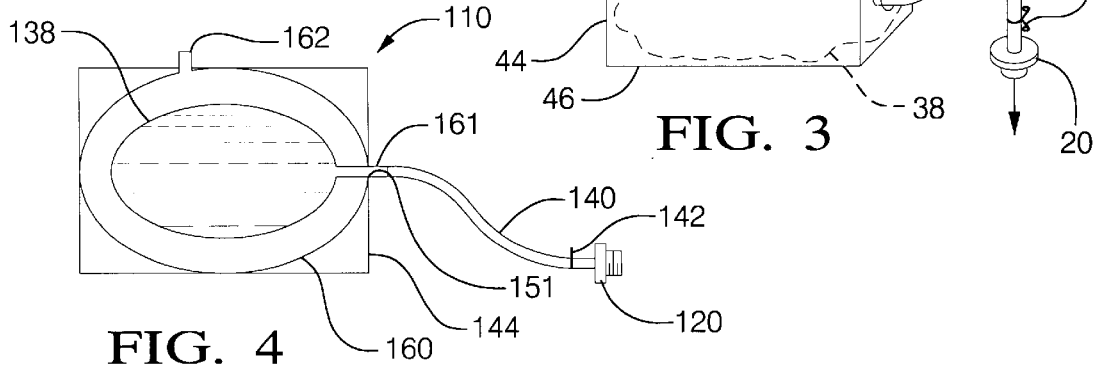
FIG. 4

PRESSURIZED BRAKE BLEED SYSTEM

TECHNICAL FIELD

The present invention relates to brake systems for motor vehicles and, more particularly, to a pressurized brake bleed system for a motor vehicle.

BACKGROUND OF THE INVENTION

There are several methods of bleeding a brake system for a motor vehicle. For example, when bleeding the brake system at an assembly plant, one method involves the use of a vacuum evacuation and brake fluid fill system. Such a vacuum evacuation and brake fluid fill system is disclosed in U.S. Pat. No. 5,088,529 which issued Feb. 18, 1992. That vacuum evacuation and brake fluid fill system is mounted to a filler tube of a master cylinder of a brake system and has a controller for directing the operation of the system to evacuate the brake system and pressure fill the brake system with brake fluid. In so doing, this method results in using a system which is expensive, cumbersome and needs a pressure and vacuum source.

When bleeding the brake system in the after market, another method involves the use of a bleeder ball system. The bleeder ball system includes a spherical ball filled with brake fluid and a hose to attach the ball to a fluid reservoir of a master cylinder of the brake system. The bleeder ball system is connected to a constant source of air pressure to push air bubbles from the brake system as a fitting or bleeder tube is opened. In so doing, this method results in using a system which is expensive, messy and needs a constant air pressure source.

Still another method of bleeding the brake system in the aftermarket is to open bleed ports or fittings in the brake system and then apply the brakes pushing the brake pedal to the floor. While the brake pedal is depressed the bleed ports or fittings are closed and then the brake pedal is released and fluid is compensated into the system from the fluid reservoir. In this method, an operator manually fills the fluid reservoir to compensate for the fluid being bled through the system. This method can result in excess brake fluid spilling over the workplace, being messy, laborous and cumbersome and it is difficult to flush all air from the brake system. Thus there is a need in the art to provide an inexpensive, aftermarket pressurized brake bleed system.

SUMMARY OF THE INVENTION

According to the present invention, an inexpensive, aftermarket, long term storage and low fluid contamination pressurized brake bleed system is provided. An aspect of the present invention is that the system has a shape for easy storage, reduces fluid/air mixing for long term storage, is designed for remote use, is lightweight, clean and may be disposed of when empty.

According to this aspect, a pressurized brake bleed system includes a rigid container and a flexible container containing brake fluid disposed within the rigid container. The pressurized brake bleed system also has a hose having one end connected to the flexible container and another end for connection to a fluid reservoir of a brake system. The pressurized brake bleed system further includes a structure to apply a force to pressurize the flexible container to bleed the brake fluid from the flexible container through the hose to the fluid reservoir.

Advantageously, the present invention is a self-contained sealed system that does not require constant air pressure and can be used in remote locations. The present invention is inexpensive, relatively clean and easily stored until ready to use. The present invention is lightweight, simple to use for the after market and has minimal fluid/air mixing for long term storage.

Other features and advantages of the present invention will be readily appreciated as the same becomes better understood after reading the subsequent description when considered in connection with the accompanying drawings.

BRIEF DESCRIPTION OF THE DRAWINGS

FIG. 1 is a fragmentary elevational view of a pressurized brake bleed system, according to the present invention, illustrated in operational relationship with a brake system for a motor vehicle.

FIG. 2 is a perspective view of the pressurized brake bleed system of FIG. 1.

FIG. 3 is a view similar to FIG. 2 illustrating operation of the pressurized brake bleed system.

FIG. 4 is an elevational view of a pressurized brake bleed system according to an alternative embodiment of the present invention.

DETAILED DESCRIPTION OF THE PRESENTLY PREFERRED EMBODIMENT

Referring to the drawings, illustrated in FIG. 1 is one embodiment of a pressurized brake bleed system 10, according to the present invention, for a brake system 12, partially shown, for a motor vehicle (not shown). The brake system 12 includes a master cylinder 14 having a fluid reservoir 16. The fluid reservoir 16 has an opening 18 at an upper end thereof to allow fluid such as brake fluid to be added and contained therein for the brake system 12. It should be appreciated that the master cylinder 14 and fluid reservoir 16 are conventional and known in the art.

Referring to FIGS. 1 through 3, the pressurized brake bleed system 10 includes a pressure bleed reservoir cap 20 removably attached to the fluid reservoir 16. The pressure bleed reservoir cap 20 includes a head portion 22 extending radially and a shaft portion 24 extending axially from the head portion 22. The shaft portion 24 is generally cylindrical in shape and has a diameter less than a diameter of the head portion 22. The shaft portion 24 has a plurality of threads 26 threadably engaging corresponding threads 28 on the opening 18 of the fluid reservoir 16. The pressure bleed reservoir cap 20 includes a seal 30 such as an O-ring disposed about the shaft 24 and prior to the threads 26. The pressure bleed reservoir cap 20 also includes a connector portion 32 extending axially from the head portion 22 opposite the shaft portion 24. The connector portion 32 is generally cylindrical in shape with a barb or flange 34 extending outwardly at one end. The pressure bleed reservoir cap 20 also includes an aperture 36 extending axially through the connector portion 32, head portion 22 and shaft portion 24. The head portion 22, shaft portion 24 and connector portion 32 are integral, unitary and formed as one-piece.

The pressurized brake bleed system 10 also includes a flexible container or bag 38 for containing and holding fluid such as brake fluid. The bag 38 is made of a flexible material having a composite structure and is filled with brake fluid. For example, an inner structure of the bag 38 can be made of a polyethylene film due to its resistance to brake fluid and an outer structure of the bag 38 can be a metalized material having toughness characteristics to resist tearing or damage. It should be appreciated that the combination of materials for the bag 38 have a resistance to water vapor absorption. It should also be appreciated that as fluid is used, the bag 38 will deform and collapse in a manner that does not cause the bag 38 to tear or break.

The pressurized brake bleed system 10 includes a flexible conduit or hose 40 having an internal passageway 41 and one end attached to the bag 38 and another end for attachment to the pressure bleed reservoir Cap 20. Preferably, the one end of the hose 40 is integral with the bag 38 and the other end of the hose 40 is disposed over the connector portion 32 of the pressure bleed reservoir cap 20. It should be appreciated that the barb 34 is inserted into the passageway 41 and retains the hose 40 to the connector portion 32.

The pressurized brake bleed system 10 includes a valve 42 such as a clamp for controlling the flow of the brake fluid through the hose 40. The valve 42 is made of a spring material and is disposed over the hose 40 such that the passageway 41 of the hose 40 is closed. It should be appreciated that, in operation, an operator manually manipulates the valve 42 to open the passageway 41 of the hose 40.

The pressurized brake bleed system 10 also includes a rigid container or box 44 for containing the bag 38. The box 44 is generally rectangular in shape and is made of a rigid material to protect the bag 38 during shipping from external objects. The box 44 has a bottom wall 46 and side walls 48 to form an open end 50. One of the side walls 48 has a hole or aperture 51 to allow the hose 40 to extend therethrough. The pressurized brake bleed system 10 further includes a lid 52 for closing the open end 50 of the box 44. The lid 52 is generally rectangular in shape and is made of a rigid material. The lid 52 has a bottom wall 54 and side walls 56. The lid 52 is removably attached to the box 44 via removable fasteners 58 passing through the side walls 56 and 48. It should be appreciated that, once the fasteners 58 are removed, the lid 52 is movable relative to the box 44.

In operation, the pressurized brake bleed system 10 is attached to the brake system 10 of the motor vehicle by removing a reservoir cap (not shown) closing the opening 18 of the fluid reservoir 16 and placing the pressure bleed reservoir cap 20 in the opening 18 of the fluid reservoir 16. The pressure bleed reservoir cap 20 is rotated such that the threads 26, 28 engage each other and the head portion 22 closes the opening 18. The hose 40 is extended through the aperture 51 in the box 44 and connected to the connector portion 32 of the pressure bleed reservoir cap 20. The fasteners 58 are removed from the lid 52 and box 44 and a force such as a weight is applied to the lid 52 as shown by the arrows in FIG. 3 to generate a bleed pressure. As a result, the lid 52 loads the brake fluid filled bag 38 and forces brake fluid out of the bag 38. The valve 42 is manually opened to control the flow of the brake fluid through the hose 40 and the pressure bleed reservoir cap 20 and into the fluid reservoir 16. When finished, the hose 40 is closed by the valve 42 and the lid 52 is set in position. The bag 38 will stay in the deformed state when the force on the lid 52 is removed so as not to draw air into the brake fluid. It should be appreciated that the bag 38 remains air free and prevents water absorption into the brake fluid remaining in the bag 38. It should also be appreciated that the pressure bleed reservoir cap 20 is removed and replaced with the reservoir cap.

Referring to FIG. 4, an alternative embodiment of the present invention is illustrated. Like parts of the pressurized brake bleed system 10 have like reference numerals increased by one hundred (100). The pressurized brake bleed system 110 includes an outer flexible bladder or bag 160 surrounding an inner flexible bladder or bag 138 filled with brake fluid. The outer bladder 160 is made of an elastomeric or rubber material and is spaced by a space or gap from the inner bladder 138. The inner bladder 138 has a tube portion 161 extending through the outer bladder 160 and an aperture 151 of the box 144. It should be appreciated that one end of the hose 140 is connected to the tube portion 161.

The outer bladder 160 has an inflator and pressure blow-off valve 162 to allow the space between the outer bladder 160 and the inner bladder 138 to be inflated and pressurized with a gas such as air. Also, the box 144 may have expansion slots (not shown) or the like to allow for deformation when the outer bladder 160 is inflated. It should be appreciated that the box 144 protects the bladders 160, 138 from damage due to external objects. It should also be appreciated that the outer bladder 160 can be inflated and the source of pressurized gas disconnected from the valve 162.

In operation of the pressurized brake bleed system 110, the pressure bleed reservoir cap 120 is connected to the fluid reservoir 16 similar to the pressure bleed reservoir cap 20. The hose 140 is connected to the pressure bleed reservoir cap 120. At this time or previously, a source of pressurized gas such as air was connected to the valve 162 and the outer bladder 160 was inflated with air to place a load on the inner bladder 138 to generate a bleed pressure. When the valve 142 is opened similar to the valve 42, brake fluid is forced out of the inner bladder 138 through the hose 140 and pressure bleed reservoir cap 120 to fill the fluid reservoir 16.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A pressurized brake bleed system comprising:

a rigid container with an open end;

a flexible container containing brake fluid disposed within said rigid container;

a hose having one end connected to said flexible container and another end for connection to a fluid reservoir of a brake system; and a structure comprising a lid closing said open end of said rigid container and being movable relative to said rigid container when a force is applied to said lid to apply the force to pressurize said flexible container to bleed the brake fluid from said flexible container through said hose to the fluid reservoir.

2. A pressurized brake bleed system according to claim 1 including fasteners for removably securing said lid to said rigid container.

3. A pressurized brake bleed system comprising:

a rigid container having an open end;

a flexible container containing brake fluid disposed within said rigid container;

a pressure bleed reservoir cap for connection to a fluid reservoir of a brake system:

a hose having one end connected to said flexible container and another end connected to said pressure bleed reservoir cap;

a lid closing said open end of said rigid container and being movable relative thereto when a force is applied to said lid to pressurize said flexible container to bleed the brake fluid from said flexible container through said hose and said pressure bleed reservoir cap to the fluid reservoir.

4. A pressurized brake bleed system according to claim 3 including fasteners for removably securing said lid to said rigid container.

5. A pressurized brake bleed system according to claim 4 wherein said pressure bleed reservoir cap has a head portion, a shaft portion extending from one end of the head portion and a connector portion extending from an opposed end of said head portion.

6. A pressurized brake bleed system according to claim 5 wherein said pressure bleed reservoir cap includes an aperture extending axially through said connector portion, said head portion and said shaft portion.

7. A pressurized brake bleed system according to claim 6 wherein said shaft portion includes threads for mating engagement with threads on an opening of the fluid reservoir.

8. A pressurized brake bleed system according to claim 3 including a valve on said hose to control fluid flow therethrough.

* * * * *